(12) United States Patent
Kwon et al.

(10) Patent No.: US 8,964,628 B2
(45) Date of Patent: Feb. 24, 2015

(54) COMMUNICATION METHOD FOR A COORDINATOR, A RELAY DEVICE, A SOURCE DEVICE AND A DESTINATION DEVICE INCLUDED IN A WIRELESS NETWORK

(75) Inventors: Hyoung-Jin Kwon, Daejeon (KR); Sung-Geun Jin, Daejeon (KR); Kap-Seok Chang, Daejeon (KR); Yong-Sun Kim, Daejeon (KR); Seung-Eun Hong, Daejeon (KR); Woo-Yong Lee, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 205 days.

(21) Appl. No.: 13/509,795

(22) PCT Filed: Oct. 26, 2010

(86) PCT No.: PCT/KR2010/007354
§ 371 (c)(1),
(2), (4) Date: May 14, 2012

(87) PCT Pub. No.: WO2011/059188
PCT Pub. Date: May 19, 2011

(65) Prior Publication Data
US 2013/0034045 A1 Feb. 7, 2013

(30) Foreign Application Priority Data

Nov. 13, 2009 (KR) .................. 10-2009-0109578
Feb. 5, 2010 (KR) .................. 10-2010-0011213
Mar. 23, 2010 (KR) .................. 10-2010-0025772
Oct. 21, 2010 (KR) .................. 10-2010-0102882

(51) Int. Cl.
*H04B 7/14* (2006.01)
*H04W 4/00* (2009.01)

(52) U.S. Cl.
USPC ............ 370/315; 370/328; 370/338; 370/392

(58) Field of Classification Search
USPC ................... 370/315, 328, 338, 392
See application file for complete search history.

(56) References Cited

U.S. PATENT DOCUMENTS

2004/0235489 A1* 11/2004 Kwon .................. 455/452.2
2005/0030930 A1* 2/2005 Cho et al. ................ 370/338

(Continued)

FOREIGN PATENT DOCUMENTS

CN 101395892 A 3/2009
JP 2009-16913 A 1/2009

(Continued)

OTHER PUBLICATIONS

Mahmud, S. et al. "Meshed high data rate personal area networks"; IEEE Communications Surveys; IEEE; New York, NY, US; vol. 10; No. 1; Jan. 1, 2008; pp. 58-69.

(Continued)

*Primary Examiner* — Andrew Lee
(74) *Attorney, Agent, or Firm* — NSIP Law

(57) ABSTRACT

Provided is a communication method of a coordinator, the method including: receiving a relay search request frame for requesting a search for at least one relay station between a destination station and a source station; and transmitting, in response to the relay search request frame, a relay search response frame including a list of the at least one relay station so that the source station selects a target relay station from the at least one relay station.

14 Claims, 9 Drawing Sheets

(56) References Cited

U.S. PATENT DOCUMENTS

| | | | |
|---|---|---|---|
| 2005/0277443 A1 | 12/2005 | Ozluturk | |
| 2006/0199530 A1* | 9/2006 | Kawasaki | 455/7 |
| 2006/0227742 A1* | 10/2006 | Furukawa | 370/329 |
| 2008/0107075 A1* | 5/2008 | Ramachandran et al. | 370/331 |
| 2008/0188177 A1* | 8/2008 | Tan et al. | 455/11.1 |
| 2008/0219275 A1* | 9/2008 | Boariu et al. | 370/401 |
| 2009/0059890 A1* | 3/2009 | Cordeiro et al. | 370/348 |
| 2009/0190522 A1* | 7/2009 | Horn et al. | 370/315 |
| 2009/0227258 A1* | 9/2009 | Youn et al. | 455/445 |
| 2010/0323711 A1* | 12/2010 | Damnjanovic et al. | 455/450 |
| 2011/0019776 A1* | 1/2011 | Zhang et al. | 375/340 |
| 2011/0268007 A1* | 11/2011 | Barany et al. | 370/312 |
| 2012/0002598 A1* | 1/2012 | Seo et al. | 370/315 |

FOREIGN PATENT DOCUMENTS

| | | |
|---|---|---|
| JP | 2009-159409 A | 7/2009 |
| JP | 2011-517156 A | 5/2011 |
| KR | 2006-0059884 A | 6/2006 |
| KR | 2009-0100401 A | 9/2009 |
| KR | 2009-0109285 A | 10/2009 |
| KR | 2009-0109536 A | 10/2009 |
| WO | WO 2009/069870 A1 | 6/2009 |
| WO | WO 2009/114502 A1 | 9/2009 |
| WO | WO-2009113834 A2 | 9/2009 |

OTHER PUBLICATIONS

IEEE Standard for Information technology—Telecommunications and information exchange between systems—Local and metropolitan area networks—Specific requirements. Part 15.3: Wireless Medium Access Control (MAC) and Physical Layer (PHY) Specifications for High Rate Wireless Personal Area Networks; IEEE Standard; IEEE; Piscataway, NJ, USA, Oct. 12, 2009; pp. c1-c187.

European Patent Office Search Report dated Apr. 29, 2013.

ECMA International, Standard ECMA-387, High Rate 60 GHz PHY, MAC and HDMI PAL, 1st Ed, Dec. 2008.

Japanese Office Action mailed Dec. 10, 2013 in counterpart Japanese Application No. 2012-538749 (2 pages, in Japanese).

Chinese Office Action issued on Aug. 13, 2014 in counterpart Chinese Application No. 201080061433.8 (9 Pages in English, 7 Pages in Chinese).

* cited by examiner

US 8,964,628 B2

COMMUNICATION METHOD FOR A COORDINATOR, A RELAY DEVICE, A SOURCE DEVICE AND A DESTINATION DEVICE INCLUDED IN A WIRELESS NETWORK

TECHNICAL FIELD

Embodiments of the present invention relate to a communication method of a coordinator, a relay station, and a destination station that are included in a wireless network supporting a contention based channel access.

BACKGROUND ART

When a protocol is designed based on assumption that stations transmit and receive signals omni-directionally in a Wireless Local Area Network (WLAN) or a Wireless Personal Area Network (WPAN) environment, communication may be performed without a need to modify the protocol even though signals are transferred through relaying for a coverage extension.

However, in a case where communication is performed using a directional antenna, when a transmitting station is aware of a position of a relay station, the transmitting station may transmit data into a direction towards a recipient station. Accordingly, in this case, a procedure of obtaining position information to relay communication between stations may be required.

In particular, millimeter wave (mmWave) such as 60 GHz of which a standardization is ongoing may be used to transmit data at a transmission rate of few Gbps using a wideband of about 2 GHz according to a simple modulation scheme. However, due to characteristics of a high frequency wave, mmWave may have strong straightness and great path loss. Accordingly, to complement the above disadvantages, a high antenna gain may be obtained by gathering a transmit power into a predetermined direction, not omni-directions, using a directional antenna.

In this instance, an array gain may be obtained by discovering a direction of the directional antenna using a facing direction between a transmitting station and a recipient station, or by discovering the direction of the directional antenna using a beamforming process for adjusting an amplitude or a phase of each of antennas constituting an antenna array.

DISCLOSURE OF INVENTION

Technical Goals

An aspect of the present invention provides a communication method that enables a general station and a relay station to recognize mutual positions by scanning stations in a network when a contention based channel access is performed using a directional antenna.

Another aspect of the present invention also provides a communication method that may select an optimal relay station for relaying a communication between a source station and a destination station, from at least one relay station between the source station and the destination station.

Technical Solutions

According to an aspect of the present invention, there is provided a communication method of a coordinator, the method including: receiving a relay search request frame for requesting a search for at least one relay station between a destination station and a source station; and transmitting, in response to the relay search request frame, a relay search response frame including a list of the at least one relay station so that the source station selects a target relay station from the at least one relay station.

According to another aspect of the present invention, there is provided a communication method of a source station, the method including: transmitting, to a coordinator, a relay search request frame for requesting a search for at least one relay station between a destination station and the source station; and receiving, from the coordinator in response to the relay search request frame, a replay search response frame including a list of the at least one relay station in order to select a target relay station from the at least one relay station.

According to still another aspect of the present invention, there is provided a communication method of a destination station, the method including: receiving, from a coordinator, a relay search response frame including a list of at least one relay station between the destination station and a source station; being assigned, from the coordinator, a resource for performing beamforming in a link between the destination station and the at least one relay station; performing beamforming with the at least one relay station using the assigned resource; performing beamforming in a link between the source station and the destination station using the assigned resource in response to a request of the source station desiring to select a target relay station from the at least one relay station; and transmitting, to the source station, information obtained from a result of the beamforming.

According to yet another aspect of the present invention, there is provided a communication method of a relay station included in a wireless network, the method including: receiving information associated with a resource assigned from a coordinator in order to perform beamforming in a link with each of a source station and a destination station, the source station requesting a search for at least one relay station between the destination station and the source station; performing beamforming with respect to the link with each of the destination station and the source station using the assigned resource; and transmitting a multi-relays channel measurement report frame including information associated with a result of beamforming so that the source station selects an optimal relay station from the at least one relay station.

According to a further another aspect of the present invention, there is provided a communication method of a coordinator, the method including: transmitting, to a relay station, a scan notice request frame requesting information regarding whether the relay station scans stations in a network; determining a size of a scan reservation duration based on a number of sectors included in a scan notice response frame received from the relay station in response to the request; transmitting, to the relay station, a station information report including information regarding a list of stations included in a Basic Service Set (BSS) of the network, whether relaying of the stations is to be supported, and capability information of the stations; and reporting, to the relay station, scan reservation information including a start offset of a reserved scan duration, a scan duration, and a number of repeated scans.

According to still another aspect of the present invention, there is provided a communication method of a relay station, the method including: transmitting, in response to a scan notice request frame received from a coordinator and when the scan notice request frame requesting information regarding whether a network scan is to be performed, a scan notice response frame including a number of sectors included in the relay station; receiving, from the coordinator, a station information report including a list of stations included in a Basic Service Set (BSS), information regarding whether relaying of the stations is to be supported, and capability information of the stations; receiving, from the coordinator, scan reservation information including a start offset of a network scan duration reserved by the coordinator, a scan duration, and a number of repeated network scans; and broadcasting a station scan request frame to the stations included in the BSS, during the reserved network scan duration.

According to still another aspect of the present invention, there is provided a communication method of a relay station, the method including: broadcasting, by the relay station obtaining a channel within a wireless network, a scan request frame including scan request information; and receiving, in response to the broadcasting, a scan response frame from at least one station included in an Independent Basic Service Set (IBSS).

Effect of the Invention

According to embodiments of the present invention, communication between a source station and a destination station may be relayed using an optimal relay station selected based on a result of beamforming that is performed with respect to a link with each of at least one relay station between the destination station and the source station. Accordingly, the communication between the source station and the destination may be smoothly performed.

Also, according to embodiments of the present invention, when a contention based channel access is performed using a directional antenna, it is possible to perform communication at a transmission rate desired by each station by relaying the communication using an optimal relay station.

BEST MODE FOR CARRYING OUT THE INVENTION

Figure 1:
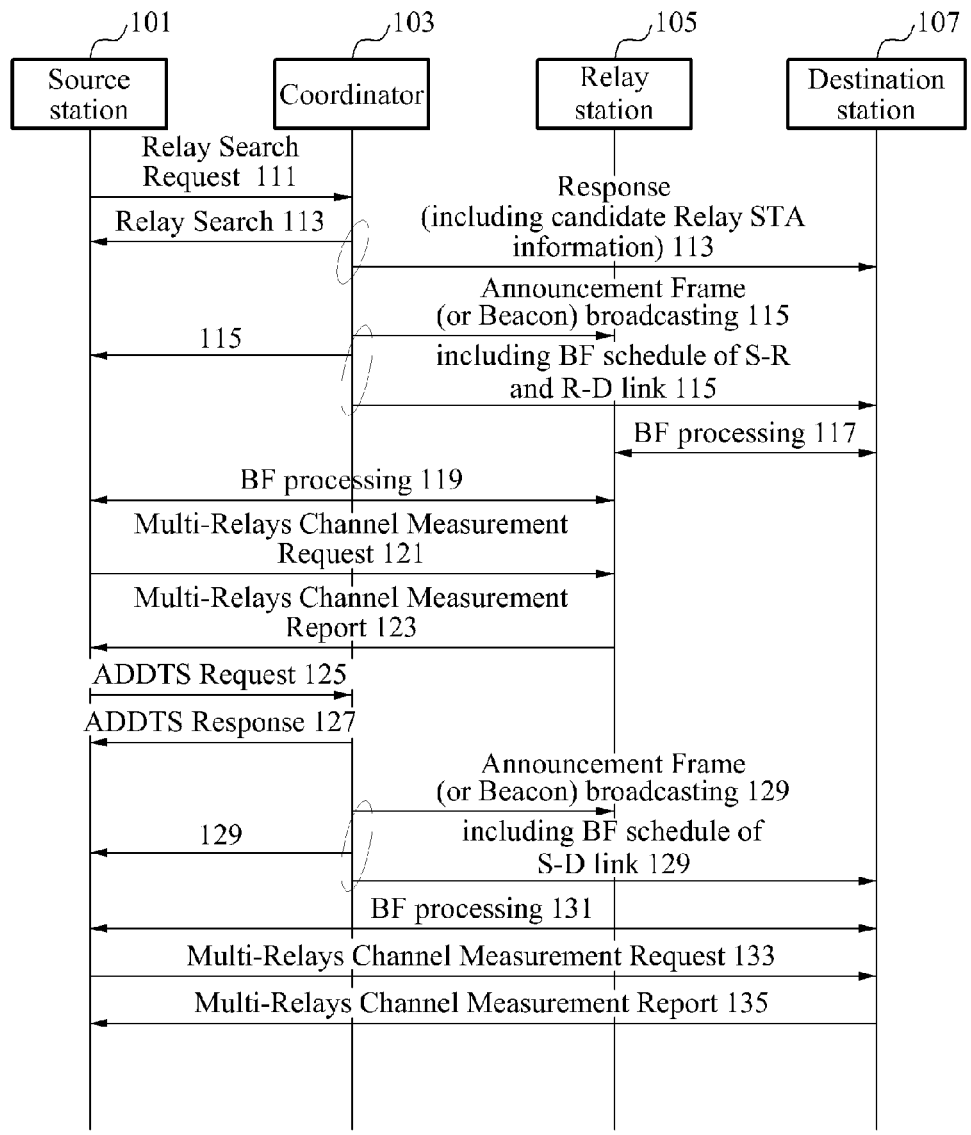
FIG. 1 is a diagram to describe an operation among a coordinator, a relay station, a source station, and a destination station in a wireless network according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

When an obstacle object, for example, a human being, blocks a transmission path, Millimeter wave (mmWave) may have a significantly great loss, generally, at least 20 dB and thus, a desired data rate may not be achieved or a communication may be suspended. In the case of a communication in a band of 60 GHz, an arrival distance may be limited to within 10 m. In a distance further than 10 m, an attenuation according to a distance may be significant without a reflection or a pass loss and thus, a signal may not reach.

Generally, in an environment such as a home, an arrival distance of a Wireless Local Area Network (WLAN) used in a band having a width of 10 m or more and being used in a band of 5 GHz or less may be tens of meters. Accordingly, compared to when the arrival distance may be covered by a single network, 60 GHz may not be covered and thus, users may feel inconvenient. In addition, in the case of an environment between rooms or between a room and a living room of which a visible distance is blocked by a door, a wall, and the like, the width may be less than 10 m, however, may not be configured using a single network.

For migration of the above blocking or for a coverage extension, a relay station for complementing a peer-to-peer communication may be provided to relay signals. Accordingly, signals may be stably transferred.

A method of using the relay station may include a relay operation defined in European Computer Manufacturers Association (ECMA) International 387 standard (high rate 60 GHz PHY, Media Access Control (MAC) and High-Definition Multimedia Interface (HDMI) Phase Alternation by Line (PAL)). This method may include a relay establishment operation of enabling a pair of a source station and a destination station to select a relay station and to thereby recognize mutual positions, and an operation of transmitting data via the relay station in an assigned time slot using a Time Division Multiple Access (TDMA) for data transmission.

However, the above method may support only a content-free duration assigned with a time slot for data transmission. In a contention duration, when a direct communication environment between the source station and the destination station is not sufficiently provided, the above method may not support relay of the relay station.

A WLAN and a Wireless Personal Area Network (WPAN) may provide a method of transmitting data using a contention-free scheme. That is, an access point (AP) of the WLAN or a pico net coordinator (PNC) of the WPAN may divide a time duration into a contention duration and a contention-free duration. In the contention-free duration, the AP or the PNC enables a station to exclusively use a predetermined time domain of the contention-free duration for data transmission using a polling scheme, a scheme of transmitting scheduling information, and the like.

For example, in the WLAN, when assigning resources to stations, the AP may occupy a channel with a highest priority and then transmit a polling message to stations using a Point Coordination Function (PCF) scheme or a Hybrid Coordination Function (HCF) Controlled Channel Access (HCCA) scheme. A transmission opportunity may be provided in a manner that the stations may transmit data immediately after receiving the polling message. In the case of the above scheme, since polling is performed with respect to only a single station at a one time, the single station may exclusively use a predetermined time duration.

In the WPAN, the contention-free duration may be divided into a plurality of time durations and resource assignment information associated with each time duration may be notified to a station using a message. Even in this case, an exclusive resource use may be allowed by assigning a predetermined time duration to a single station.

In the contention duration, all the stations of a network may contend with each other using a Carrier Sense Multiple Access/Collision Avoidance (CSMA/CA) scheme in order to acquire a channel.

According to an embodiment of the present invention, there is provided a method of scanning a network and recognizing positions of stations for relaying of data via a relay station in a contention duration. For example, a Distributed Coordination Function (DCF) scheme of the WLAN enables all the stations to contend with a channel access opportunity based on an equivalent condition. A station obtaining the channel access opportunity may report, to adjacent stations, reservation information indicating that a channel is to be used soon through exchange of a Request To Send (RTS) frame and a Clear To Send (CTS) frame. In this instance, using a duration field value included in the RTS frame, it is possible to prevent a collision between a data frame transmitted after a control frame and a data frame with respect to a time duration required for a corresponding acknowledgement (ACK).

In the contention duration, even though stations 1 and 2 transmitting data make a detour via a relay station due to an obstacle positioned in a path, exchange of the RTS frame and the CTS frame may be performed.

In particular, in the case of a 60 GHz wireless communication system recommended for a directional communication, when data is transmitted by changing a direction, interference may occur in a communication between adjacent stations initially using a corresponding channel. When the station 2 is unaware of data transmission from the station 1, the station 2 may be in an omni-receiving state and thus, need a control frame such as the RTS/CTS frame reporting about the data transmission prior to actual data transmission.

However, in an original standard, exchange of the RTS frame and the CTS frame may not necessarily need to be performed. Specifically, a data frame may be immediately transmitted without transmitting the control frame. In this stance, whichever the relay station receives between the control frame and the data frame, the relay station may transmit a received frame towards a corresponding direction only when the relay station is aware of a position of the station 2.

Accordingly, prior to participating into relay transmission, the relay station may verify information regarding adjacent network stations through scanning. The information may include a position of each adjacent network station, a direction thereof, a providing function thereof, and the like.

Scanning may be performed using a variety of schemes and thus, is not particularly limited to a predetermined scheme.

For example, in the case of an Institute of Electrical and Electronics Engineers (IEEE) 802.15.3c standard, a directional association process may be representative. According to the IEEE 802.15.3c standard, the PNC may transmit a quasi-omni-beacon to each sector in turn and may listen to a response from each sector in turn in a contention access period (CAP) in order to support a directional communication. Accordingly, the PNC may perform a station association process with respect to each sector direction in which the PNC receives an association response frame coming into a direction matched with a transmission direction.

In an aspect of a station, the station may listen to a beacon by fixing a sector of the station to a single beacon period, and turn one round of the sector and then select a beacon with a strongest signal and transmit a response frame in a CAP slot corresponding to a sector direction of the selected beacon. Next, the PNC may recognize a station positioned in a direction of which sector among adjacent stations, and a corresponding adjacent station may also recognize a position of the PNC by transmitting a response frame to the PNC into a direction of a strongest beacon. Accordingly, the PNC and the corresponding adjacent station may perform a directional communication into the corresponding direction. To obtain a higher gain than general, a beamforming procedure may be performed prior to data transmission.

A function of a scan process enables a relay station to divide a scan frame for each sector and thereby transmit the scan frame, and to receive a scan response frame for each sector and to thereby verify a position of a station. When the relay station verifies a position of each station, the relay station may generate a list of stations.

Next, even though a destination address of a frame transmitted to the relay station does not designate a corresponding station, the corresponding station may not discard the frame and discover a sector direction by searching a list using an address of a destination station and then transmit the frame into the discovered sector direction. Next, when the frame is transferred to the destination station and the destination station relays the frame using the relay station, the destination station may transmit a response frame to a frame (hereinafter, a source station) having transmitted the frame via the relay station. The relay station may discover in advance a sector direction about the source station and then transfer the frame towards the discovered sector direction as soon as the frame is received. As described above, by verifying in advance a station position, it is possible to quickly relay the frame towards the verified direction when relaying to the relay station occurs.

In addition, since stations desiring to relay a communication using the relay station participate into relay scan, a number of scans may decrease compared to scanning per source-destination pair. However, after the scanning, a relay station may initiate scan or a station desiring to use the relay station may migrate. Accordingly, the relay station may perform scan again. In this instance, other stations may initiate a scan operation for discovering a direction of each station migrating after a source station or a destination station is determined. The relay stations may also participate into the scan operation.

However, the scan operation may be similar to a process of a coordinator broadcasting a message to stations included in a network of the coordinator or receiving a response from each station. The operation may be performed by only the coordinator and thus, may be performed only when a coordinator handover is performed.

In this case, a beamforming process may be performed to discover each other between stations. However, full-beamforming may use a relatively large amount of time. Accordingly, to verify a mutual position in a sector level corresponding to a first step of the beamforming operation, a sector level training process for sector sweep may be used. FIG. 1 illustrates an example of using sector level beamforming.

FIG. 1 is a diagram to describe an operation among a coordinator 103, a relay station 105, a source station 101, and a destination station 107 in a wireless network according to an embodiment of the present invention.

Referring to FIG. 1, the wireless network may include the source station 101, the coordinator 103, the relay station 105, and the destination station 107.

In operation 111, when the source station 101 desires to communicate with the destination station 107, the source station 101 may transmit a relay search request frame to the coordinator 103 to request a discovery of the relay station 105 for relaying.

In response to the relay search request frame, the coordinator 103 may transmit, the source station 101, a relay search response frame including a list of stations, for example, the relay station 105 known to the coordinator 103 as relay supportable stations. In operation 113, the coordinator 103 may also transmit a relay search response frame to the destination station 107.

In this instance, the coordinator 103 may indicate that a station included in the list may perform relaying by setting a dialog token of the relay search response frame to '0'.

Specifically, a station having requested beamforming may verify that the station included in the list may perform relaying based on the dialog token of the relay search response frame.

In operation 115, the coordinator 103 may assign a resource for performing beamforming in a link between the source station 101 and at least one relay station 105 (S-R link) and a link between the destination 107 and the at least one relay station 105 (D-R link), and may announce the assigned resource to each of the source station 101, the destination station 107, and the relay station 105.

To perform beamforming, the coordinator 103 may broadcast information associated with the resource assigned to the S-R link and the D-R link using an announcement frame, a beacon, and the like.

In operation 117, the destination station 107 may perform beamforming in the link between the relay station 105 and the destination station 107 (R-D link) link using the assigned resource. In operation 119, the source station 101 may perform beamforming in the S-R link.

When beamforming is completed with respect to the above two links, the source station 103 may transmit a multi-relays channel measurement request frame to the relay station 105 in operation 121. The relay station 105 may verify that the beamforming process is to relay data between the source station 101 and the destination station 107, based on the multi-relays channel measurement request frame.

In operation 123, in response to the multi-relays channel measurement request frame, the relay station 107 may transmit, to the source station 101, a multi-relays channel measurement report frame including information associated with a beamforming result so that the source destination 101 may select an optimal relay station.

The multi-relays channel measurement report frame is based on the result of beamforming performed with respect to each of the R-D link and the R-S link.

A channel measurement info field of the multi-relays channel measurement report frame may include at least one of a destination AID field including an AID of each of at least one relay station 105 of which a link is measured by the destination station 107, and a recommend field indicating whether a signal to noise ratio (SNR) value measured in each link between the destination station 107 and the at least one station 105, an angle between the link between each of the at least one relay station 105 and the source station 101 and the link between each of the at least one relay station 105 and the destination station 107 are suitable for relaying between the source station 101 and the destination station 107 determined by the at least one relay station 105. The channel measurement info field may be used when the source station 101 selects a final relay station, for example, a target relay station.

In operations 125 and 127, the source station 101 may obtain information associated with the beamforming result and then request the coordinator 103 for a resource for performing beamforming in a link between the source station 101 and the destination station 107 (S-D link), and may negotiate with the coordinator 103.

The source station 101 may obtain information associated with the beamforming result using a multi-relays channel measurement report frame.

In operation 129, the coordinator 103 may broadcast, to each of the source station 101 and the destination station 107, information associated with the resource assigned to the S-D link.

In this instance, information associated with the resource assigned to the S-D link may include information associated with schedule of beamforming that is performed in the S-D link.

The coordinator 103 may broadcast information associated with the resource assigned to the S-D link using an announcement frame, a beacon, and the like.

In operation 131, the source station 101 and the destination station 107 may perform beamforming in a duration assigned by the announcement frame or the beacon.

In operation 133, after beamforming, the source station 101 may transmit a multi-relays channel measurement request frame to the destination station 107 to obtain information associated with R-D links of when performing beamforming with each of at least one relay station included in the wireless network.

Based on the multi-relays channel measurement request frame, the destination station 107 may become aware of that the source station 101 is discovering an optimal relay station for relaying a communication with the destination station 107.

In operation 135, in response to the multi-relays channel measurement request frame, the destination station 107 may transmit a multi-relays channel measurement report frame to the source station 101 so that the source station 101 may select the optimal relay station from the at least one relay station 105.

In this instance, the multi-relays channel measurement report frame may include channel information associated with each of links of relays having performed beamforming with the destination station 107 among relay stations included in a list of a relay search response frame.

Even though beamforming is not completed in the link between the source station 101 and the destination station 107 in operation 135, previous beamforming of the relay station 105 may have been a success. Since data may be transmitted via the relay station 105, a coverage extension may be enabled by means of the relay station 105.

Hereinafter, a format of each frame used for communication will be described by referring to Table 1 through Table 4.

TABLE 1

| Order | Information |
| --- | --- |
| 1 | Category |
| 2 | Action |
| 3 | Dialog Token |

Table 1 shows a format of a multi-relays channel measurement request frame.

The multi-relays channel measurement request frame corresponds to a frame that a station (herein, the source station 101) starting a relay operation transmits to a recipient station (here, the relay station 105 or the destination station 107) to obtain channel measurement information of a link between the recipient station and a remaining station.

The multi-relays channel measurement request frame may include at least one of a category field, an action field, and a dial token field.

The category field corresponds to an area for setting a range of mmWave used in the wireless network.

The action field corresponds to an area for setting a value associated with a multi-relays channel measurement request.

The dialog token field corresponds to an area for a value selected by a station transmitting the multi-relays channel measurement request frame in order to identify a transaction between a measurement request with respect to a multi-relays channel and a corresponding response.

TABLE 2

| Order | Information |
|---|---|
| 1 | Category |
| 2 | Action |
| 3 | Dialog Token |
| 4 | Channel Measurement Info 1 |
| ... | ... |
| N + 3 | Channel Measurement Info N |

Table 2 shows a format of a multi-relays channel measurement report frame.

The multi-relays channel measurement report frame may be transmitted as a response to the multi-relays channel measurement request frame.

The multi-relays channel measurement report frame may include at least one of a category field, an action field, a dialog token field, and at least one channel measurement info field.

The category field corresponds to an area for setting a range of mmWave used in the wireless network.

The dialog token field corresponds to an area set to a value included in the multi-relays channel measurement request frame. When the multi-relays channel measurement request frame is not received, however, the multi-relays channel measurement report frame is transmitted, the dialog token field may be set to '0'.

At least one channel measurement info field may include description as shown in Table 3, and may include information associated with a link of each of at least one relay station.

When a station (e.g., the destination station 107) transmitting the multi-relays channel measurement report frame measures channel information associated with a link with each of relay stations, a plurality of channel measurement info fields may be included as shown in Table 2.

TABLE 3

| | Peer STA AID | SNR | Internal Angle | Recommend | Reserved |
|---|---|---|---|---|---|
| Bits: | B0-B7 | B8-B15 | B16-B22 | B23 | B24-B31 |

Table 3 shows a format of the channel measurement info field.

As described above, the channel measurement info field may include information associated with a link between a corresponding station and each relay station, and may include at least one of a destination AID (Peer STA AID), an SNR field, an internal angle field, and a recommend field.

The destination AID (Peer STA AID) corresponds to an area including an AID of each of at least one relay station of which a link is measured by the destination station 107 (or a peer station).

The SNR field corresponds to an area for indicating an SNR value measured in a link for the peer station, that is, in each link between the destination station 107 and the at least one relay station 105.

The internal angle field indicates a difference (an included angle) between two directions towards links between the relay station 105 and other two stations participating into the relay operation. That is, the internal angle denotes an angle formed by a link between the relay station 105 and the source station 101, and a link between the relay station 105 and the destination station 107.

The recommend field corresponds to an area for indicating whether at least one relay station is suitable for relaying between the source station 101 and the destination station 107. That is, the recommend field corresponds to an area for indicating whether the relay operation is recommended based on a channel measurement result with peer stations (here, the source station 101 and the destination station 107).

The recommend field may be set to '1' when a reporting station (here, the relay station 105) recommends the relay operation as a result of measuring a channel of a link with each different station, and may be set to '0' when the reporting station does not recommend the relay operation.

TABLE 4

| Action field value | meaning |
|---|---|
| 0 | Relay search request |
| 1 | Relay search response |
| 2 | RLS request |
| 3 | RLS response |
| 4 | RLS announcement |
| 5 | Scan Notice Request |
| 6 | Scan Notice Response |
| 7 | STA Info Report |
| 8 | Scan Reservation Report |
| 9 | STA Scan Request |
| 10 | STA Scan Response |
| 11-255 | Reserved |

Table 4 defines a plurality of action frames to support a relaying function.

An action field value for identifying each action in the action field of Table 1 and Table 2 may be given as Table 4.

Here, action fields 5 to 10 may be associated with a relay station scan.

Figure 2:
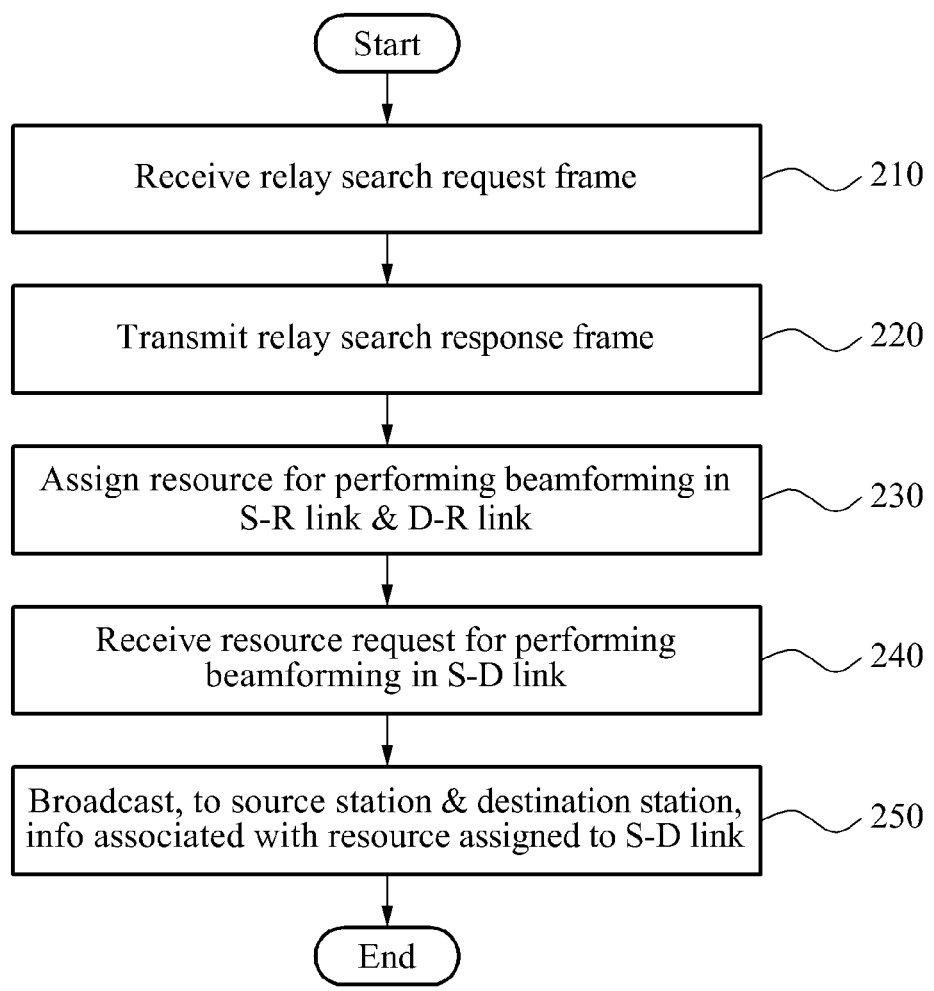
FIG. 2 is a flowchart illustrating a communication method of a coordinator according to an embodiment of the present invention.

FIG. 2 is a flowchart illustrating a communication method of a coordinator according to an embodiment of the present invention.

Referring to FIG. 2, in operation 210, the coordinator may receive a relay search request frame for requesting a search for at least one relay station between a destination station and a source station.

The relay search request frame may include at least one of a category field for setting a range of a millimeter wave used in a wireless network, an action field for setting a value associated with a search request with respect to the at least one relay station, a dialog token field set to a value selected by a station transmitting the relay search request frame, and a destination station AID field for setting an AID for the destination station.

A value selected by a station transmitting the relay search request frame in order to identify a transaction between a search request for the at least one relay station and a corresponding response may be set to the dialog token field.

In operation 220, in response to the relay search request frame, the coordinator may transmit a relay search response frame including a list of the at least one relay station so that the source station may select a target relay station from the at least one relay station.

The relay search response frame may include at least one of a category field for setting a range of a millimeter wave used in a wireless network, an action field for setting a value associated with a relay search response corresponding to a search request with respect to the at least one relay station, a dialog token field for setting a value about the relay search request frame used to generate the relay search response, a status code field including a status code indicating whether relay of a corresponding station is available, and a relay capable station info field denoting information associated with the corresponding station.

When a status code indicating a relay capability, included in the status code field, is a 'success', the relay capable station info field may be included in the relay search response frame.

In operation 230, the coordinator may assign a resource for performing beamforming in a link between the source station and the at least one relay station (S-R link) and a link between the destination station and the at least one relay station (D-R link).

In operation 240, the coordinator may receive, from the source station, a resource request for performing beamforming in a link between the source station and the destination station (S-D link) after the source station obtains information associated with a result of the beamforming, and may respond to the resource request.

Information associated with the beamforming result obtained by the source station may match information obtained by a multi-relays channel measurement report frame.

In operation 250, the coordinator may broadcast, to the source station and the destination station, information associated with a resource assigned to the link between the source station and the destination station (S-D link).

Figure 3:
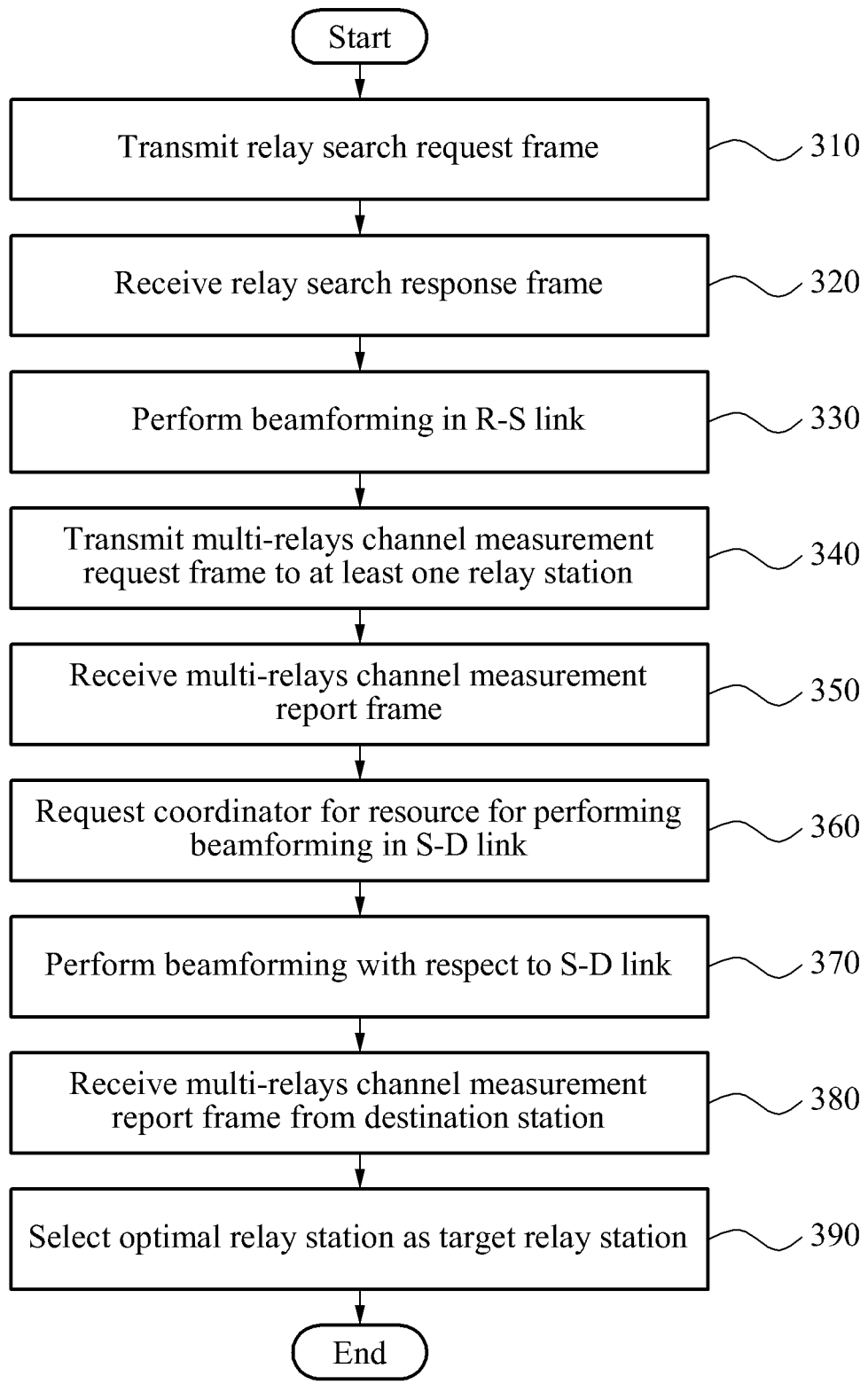
FIG. 3 is a flowchart illustrating a communication method of a source station according to an embodiment of the present invention.

FIG. 3 is a flowchart illustrating a communication method of a source station according to an embodiment of the present invention.

Referring to FIG. 3, in operation 310, the source station may transmit, to a coordinator, a relay search request frame for requesting a search for at least one relay station between a destination station and the source station.

In operation 320, the source station may receive, from the coordinator in response to the relay search request frame, a replay search response frame including a list of the at least one relay station in order to select a target relay station from the at least one relay station.

In operation 330, the source station may perform beamforming in a link between the at least one relay station and the source station (R-S link) using a resource assigned by the coordinator.

In this instance, the source station may perform beamforming based on a sector unit in the link between the at least one relay station and the source station (R-S link).

In operation 340, the source station may transmit a multi-relays channel measurement request frame to the at least one relay station.

Descriptions related to the multi-relays channel measurement request frame may refer to the descriptions made above with reference to Table 1.

In operation 350, in response to the multi-relays channel measurement request frame, the source station may receive a multi-relays channel measurement report frame from the at least one relay station.

The multi-relays channel measurement report frame may include information associated with a result of beamforming performed in each of a link between each of the at least one relay station and the source station and a link between each of the at least one relay station and the destination station.

Descriptions related to the multi-relays channel measurement report frame may refer to the descriptions made above with reference to Table 2 and Table 3.

In operation 360, the source station may request the coordinator for a resource for performing beamforming in a link between the source station and the destination station (S-D link) after obtaining information associated with the result of beamforming.

Here, information associated with the beamforming result obtained by the source station may match information obtained by the multi-relays channel measurement report frame.

In operation 370, the source station may perform beamforming with respect to the link between the destination station and the source station using the resource assigned from the coordinator.

In operation 380, the source station may receive, from the destination station, the multi-relays channel measurement report frame including channel information associated with each of links of relay stations performing beamforming with the destination station among relay stations included in the list of the at least one relay station.

The multi-relays channel measurement report frame may be a response to the multi-relays channel measurement request frame requested to the destination station so that the source station may select an optimal relay station from the at least one relay station.

In operation 390, the source station may select, as a target relay station, an optimal relay station from the at least one relay station using a position of the at least one relay station and channel information associated with each of the links.

Figure 4:
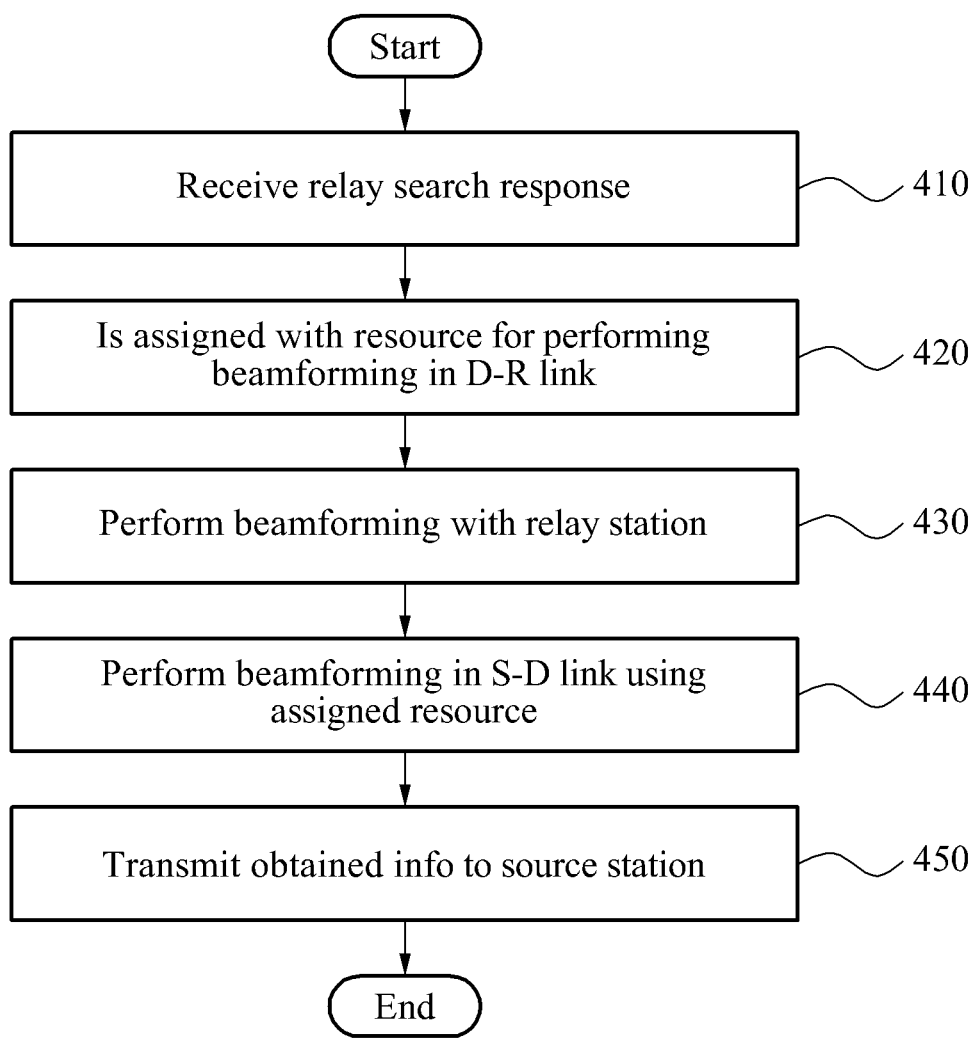
FIG. 4 is a flowchart illustrating a communication method of a destination station according to an embodiment of the present invention.

FIG. 4 is a flowchart illustrating a communication method of a destination station according to an embodiment of the present invention.

Referring to FIG. 4, in operation 410, the destination station may receive, from a coordinator, a relay search response frame including a list of at least one relay station between the destination station and a source station.

The relay search response frame corresponds to a response to a relay search request frame that is received by the coordinator and is requested for a search for the at least one relay station between the destination station and the source station.

In operation 420, the destination station may be assigned, from the coordinator, a resource for performing beamforming in a link between the destination station and the at least one relay station (D-R link).

In operation 430, the destination station may perform beamforming with the at least one relay station using the assigned resource.

In operation 440, the destination station may perform beamforming in a link between the source station and the destination station (S-D link) using the assigned resource in response to a request of the source station desiring to select a target relay station from the at least one relay station.

In operation 450, the destination station may transmit, to the source station, information obtained from a result of the beamforming.

The destination station may transmit the obtained information to the source station using a multi-relays channel measurement report frame.

Figure 5:
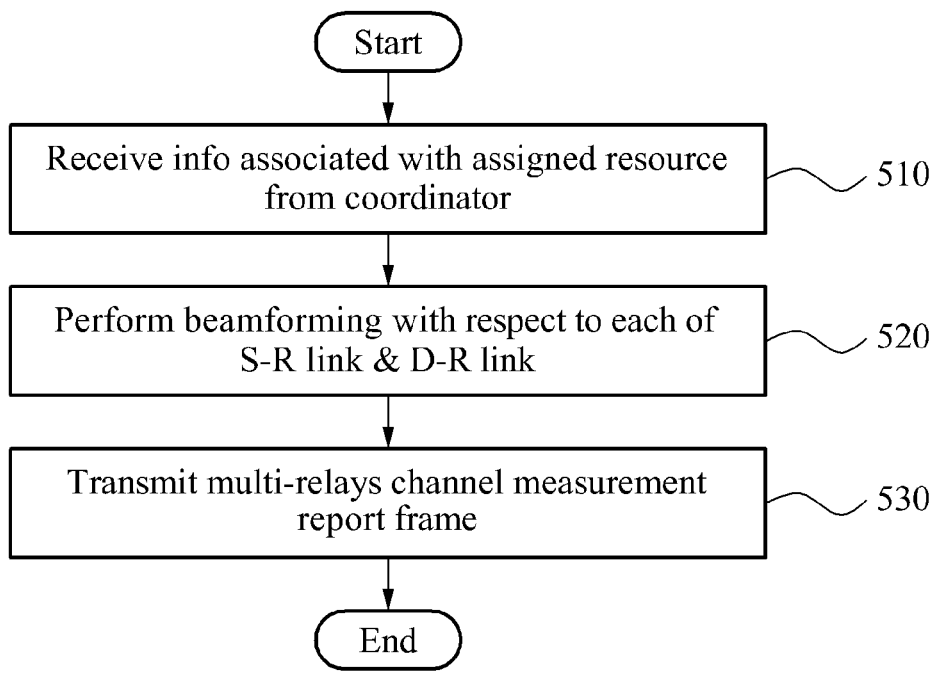
FIG. 5 is a flowchart illustrating a communication method of a relay station according to an embodiment of the present invention.

FIG. 5 is a flowchart illustrating a communication method of a relay station according to an embodiment of the present invention.

Referring to FIG. 5, in operation 510, the relay station may receive information associated with a resource assigned from a coordinator in order to perform beamforming in a link with each of a source station and the destination (S-D link). The source station may request a search for at least one relay station between the destination station and the source station.

In operation 520, the relay station may perform beamforming with respect to the link with each of the destination station and the source station (S-R link and R-D link) using the assigned resource.

In operation 530, the relay station may transmit a multi-relays channel measurement report frame including information associated with a result of beamforming so that the source station may select an optimal relay station from the at least one relay station.

Figure 6:
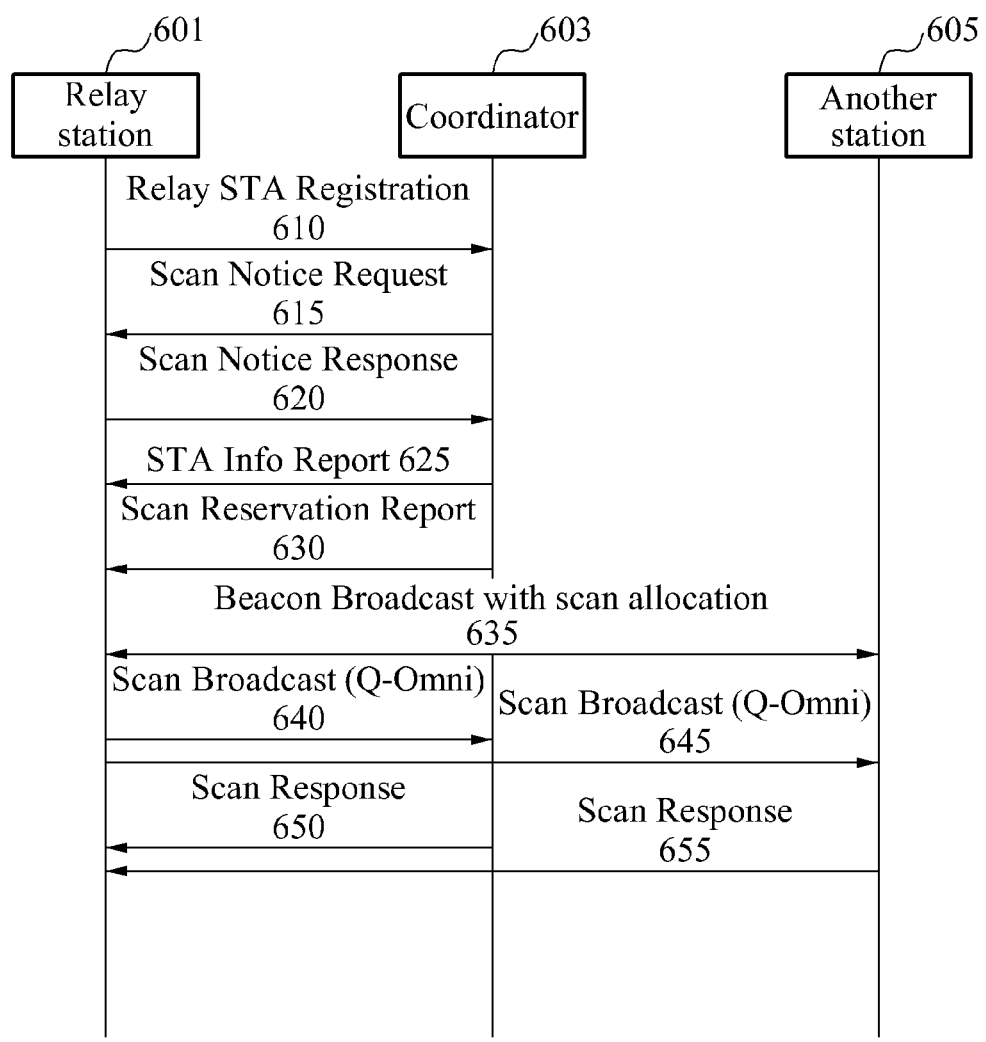
FIG. 6 is a flowchart to describe a scan process of a relay station in a Wireless Local Area Network (WLAN) infrastructure Basic Service Set (BSS) mode according to an embodiment of the present invention.

FIG. 6 is a flowchart to describe a scan process of a relay station in a Wireless Local Area Network (WLAN) infrastructure Basic Service Set (BSS) mode according to an embodiment of the present invention.

Referring to FIG. 6, in the WLAN infrastructure BSS mode, a wireless network may include a relay station 601, a coordinator 603, and another station 605.

In operation 610, it may be assumed that the relay station 601 reported to the coordinator 603 that the relay station 601 corresponds to a corresponding relay station in order to perform a scan process with respect to stations included in the wireless network. The coordinator 603 may be, for example, an AP or a PNC.

In operation 615, when a network scan of the relay station 601 is possible, the relay station 601 may transmit, to the relay station 601, a scan notice request frame asking whether the relay station 601 is to perform scan. When the relay station 601 may perform relaying, the relay station 601 receiving the scan notice request frame may set a status code to 'successful' and include a number of sectors of the relay station 601 and thereby transmit a scan notice response frame to the coordinator 603 in operation 620.

The coordinator 603 may determine a scan reservation duration based on the number of sectors.

In operation 625, the coordinator 603 receiving the scan notice response frame may transmit, to the relay station 601, a station information report including a list of stations included in a BBS of a network of the coordinator 603 and information associated with the stations.

Here, information associated with the stations may include information regarding whether relaying of corresponding stations is supported and a capability of the stations.

In operation 630, the coordinator 603 may report, to the relay station 601, scan reservation information including a start offset of a network scan duration reserved by the coordinator, a scan duration, and a number of repeated network scans.

In operation 635, the relay station may report to stations included in the BBS by inserting the scan reservation information into a beacon or by using an announcement frame and the like. The relay station 601 and the other stations 605 may participate into the scan process of the relay station 601 during a scan duration reported from the scan reservation information.

Next, the relay station 601 may broadcast a station scan request frame to the stations, for example, the coordinator 603 and the other stations 605, within the wireless network during the reserved scan duration.

In operations 640 and 645, in the case of broadcasting the station scan request frame, when the relay station 601 may not broadcast the station scan request frame omni at a one time, the relay station 601 may quasi-omni broadcast the station scan request frame for each sector. When sweep is performed, it is possible to obtain the same effect as transmission into the omni-directions.

In this instance, the relay station 601 may assign an ID for each sector and may report about information regarding which sector is being currently broadcasted, and information regarding a start point in time and a duration with respect to a response to the request.

Here, a response duration may be valid in a subsequent beacon period, and a total number of response durations may correspond to a number of scan broadcasts. The relay station 601 may verify whether the relay station 601 is included in a relay station list by transmitting a station AID of a station having received the response in a previous scan using a station scan request frame.

Also, to provide a standard for a selection of the relay station 601 to the other stations 605, the station scan request frame may include a relay capability field and may include an AID of a corresponding pair when RLS with the other stations 605 is performed.

In operation 650 and 655, the stations, for example, the coordinator 603 and the other stations 605, receiving the station scan request frame may transmit a station scan response frame to the relay station 601 using a response duration corresponding to a station scan request frame having a strongest signal strength. In this instance, an AID may be used to identify each station.

The relay station 601 receiving the station scan response frame may constitute a station list for each sector.

The relay station 601 may not listen to a response, for example, the station scan response frame. Even though the response is transmitted, the response may collide with a message of another station and thus, may not reach the relay station 601. Accordingly, each of stations transmitting a station scan response frame may verify whether the station is included in a station list using a station scan request frame in a subsequent beacon period of the same time.

Hereinafter, each frame used in a WLAN infrastructure BBS mode and the WLAN Independent Basic Service Set (IBSS) mode, and information included in each frame will be described with reference to Table 5 through Table 10.

TABLE 5

| Order | Information |
|-------|-------------|
| 1 | Category |
| 2 | Action |
| 3 | |
| 4 | |
| ... | ... |

Table 5 shows a format of a scan notice request frame.

When the coordinator 603 has a relaying policy and a station making a relay search request exists, the scan notice request frame may be used to request the relay station 601 for scan.

Here, a category field may use one of values not used as a value to classify an action frame in a WLAN. A value of the action field may use a value indicating the relay search request frame of Table 4.

TABLE 6

| Order | Information |
|-------|-------------|
| 1 | Category |
| 2 | Action |

TABLE 6-continued

| Order | Information |
|---|---|
| 3 | Status Code |
| 4 | # of Sector |
| ... | ... |

Table 6 shows a format of a scan notice response frame.

When the relay 601 may perform relaying, the scan notice response frame may set a status code to 'successful', and the relay station 601 may transmit a number of sectors of the relay station 601. The coordinator 603 may determine a scan reservation duration based on the number of sectors.

TABLE 7

| Order | Information |
|---|---|
| 1 | Category |
| 2 | Action |
| 3 | STA 1 AID |
| 4 | STA 1 Info |
| ... | ... |
| 2N (the number of STAs in BSS) + 2 | STA N AID |
| 2N + 3 | STA N Info |

Table 7 shows a format of a station information report frame.

The coordinator 603, for example, an AP, receiving the scan notice response frame may transmit, to the relay station 601, a list of stations included in the BBS and information of the stations.

Information of the stations may include information regarding whether relaying of a corresponding station is supported, a capability thereof, and the like.

TABLE 8

| Order | Information |
|---|---|
| 1 | Category |
| 2 | Action |
| 3 | Scan Start Offset |
| 4 | Scan Duration |
| 5 | # of scan broadcast |

Table 8 shows a format of a scan reservation report frame.

The coordinator 603 receiving the scan notice response frame may report, to the relay station 601, scan reservation information including a start offset of s scan duration reversed by the relay station 601, a duration thereof, and a number of scans using the scan reservation report frame.

The scan reservation information may be reported to the stations included in the BSS of the network by being inserted into a beacon, or by using an announcement frame, and the like.

Based on the scan reservation information included in the scan reservation report frame, the relay station 601 and the other stations 605 may participate into the reported scan duration and thereby participate into a scan process.

TABLE 9

| Order | Information |
|---|---|
| 1 | Category |
| 2 | Action |
| 3 | # of Sector |
| 4 | Sector ID |
| 5 | Response Start Offset |

TABLE 9-continued

| Order | Information |
|---|---|
| 6 | Response Duration |
| 7 | # of STA Scanned(=N) |
| 8 | STA 1 AID |
| ... | ... |
| N + 7 | STA N AID |
| N + 8 | RLS Source AID 1 |
| N + 9 | RLS Destination AID 1 |
| ... | ... |
| N + 2M + 6 | RLS Source AID M |
| N + 2M + 7 | RLS Destination AID M |

Table 9 shows a format of a station scan request frame.

The station scan request frame transmitted by the relay station 601 may quasi-omin be broadcasted for each sector.

The relay station 601 may assign an ID for each sector in the station scan request frame, and may report about information regarding which sector is being currently broadcasted.

In this instance, the relay station 601 may assign an ID for each sector using the station scan request frame, and report about information regarding which sector is being currently broadcasted, and information regarding a start point in time and a duration with respect to a response to the request.

Here, the response duration may be valid in a subsequent beacon period, and a total number of response durations may correspond to a number of scan broadcasts. The relay station 601 may verify whether the relay station 601 is included in a relay station list by transmitting a station AID of a station having received the response in a previous scan using a station scan request frame.

TABLE 10

| Order | Information |
|---|---|
| 1 | Category |
| 2 | Action |
| 3 | AID |
| 4 | |
| ... | ... |

Table 10 shows a format of a station scan response frame.

Stations receiving the station scan request frame may transmit a station scan response frame to the relay station 601 using a response duration corresponding to a station scan request frame having a strongest signal strength.

In this instance, an AID may be used to identify each station.

The relay station 601 receiving the station scan response frame may constitute a station list for each sector.

The relay station 601 may not listen to a response, for example, the station scan response frame. Even though the response is transmitted, the response may collide with a message of another station and thus, may not reach the relay station 601. Accordingly, each of stations transmitting a station scan response frame may verify whether the station is included in a station list using a station scan request frame in a subsequent beacon period of the same time.

Figure 7:
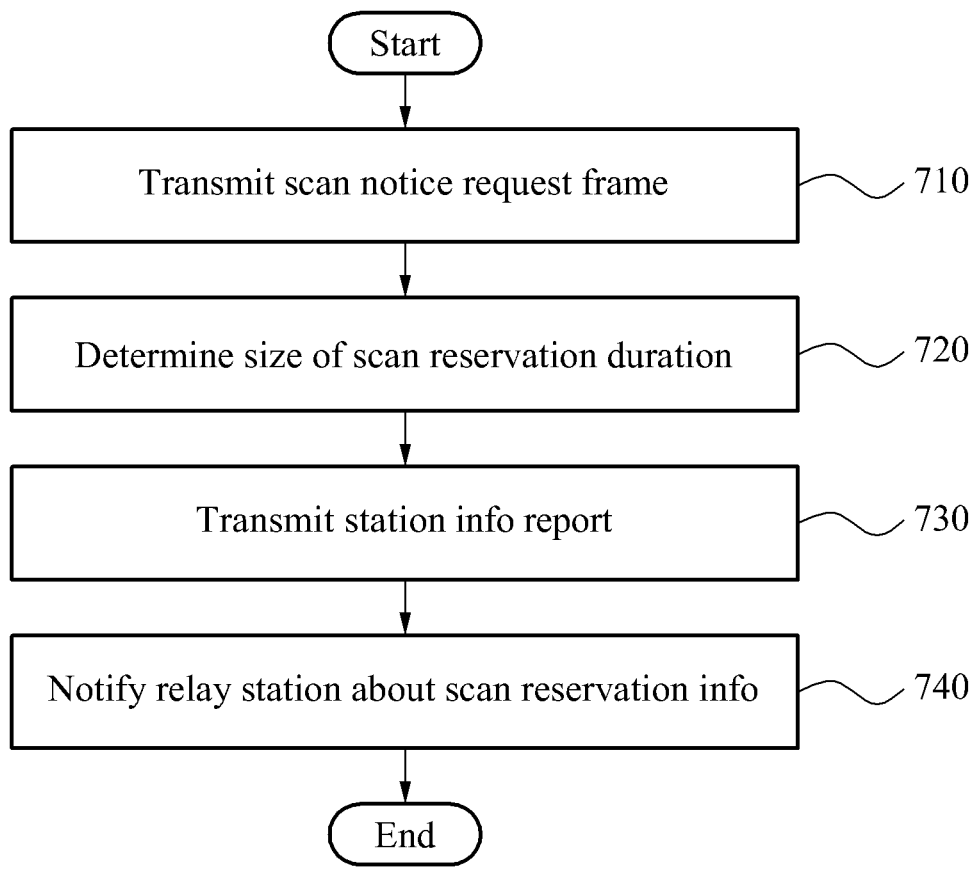
FIG. 7 is a flowchart illustrating a communication method of a coordinator according to an embodiment of the present invention.

FIG. 7 is a flowchart illustrating a communication method of a coordinator according to an embodiment of the present invention.

Referring to FIG. 7, in operation 710, the coordinator may transmit, to a relay station, a scan notice request frame requesting information regarding whether the relay station scans stations in a network.

In operation 720, the coordinator may determine a size of a scan reservation duration based on a number of sectors included in a scan notice response frame received from the relay station in response to the request.

In operation 730, the coordinator may transmit, to the relay station, a station information report including information regarding a list of stations included in a Basic Service Set (BSS) of the network, whether relaying of the stations is to be supported, and capability information of the stations.

In operation 740, the coordinator may report, to the relay station, scan reservation information including a start offset of a reserved scan duration, a scan duration, and a number of repeated scans.

Figure 8:
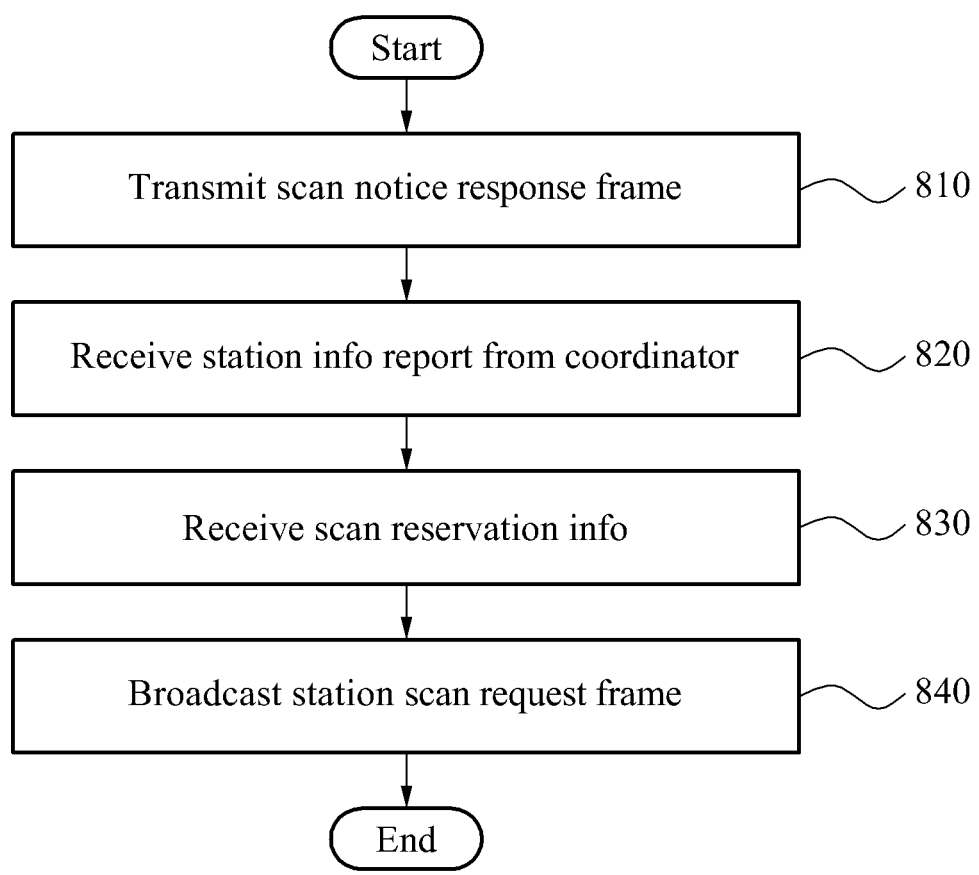
FIG. 8 is a flowchart illustrating a communication method of a relay station according to an embodiment of the present invention.

FIG. 8 is a flowchart illustrating a communication method of a relay station according to an embodiment of the present invention.

Referring to FIG. 8, in operation 810, in response to a scan notice request frame received from a coordinator and when the scan notice request frame requesting information regarding whether a network scan is to be performed, the relay station may transmit a scan notice response frame including a number of sectors included in the relay station.

In operation 820, the relay station may receive, from the coordinator, a station information report including a list of stations included in a BSS, information regarding whether relaying of the stations is to be supported, and capability information of the stations.

In operation 830, the relay station may receive, from the coordinator, scan reservation information including a start offset of a network scan duration reserved by the coordinator, a scan duration, and a number of repeated network scans; and In operation 840, the relay station may broadcast a station scan request frame to the stations included in the BSS, during the reserved network scan duration.

When the station scan request frame is not transmitted to the stations included in the BSS omni at a one time, the relay station may quasi-omni broadcast the station scan request frame for each sector.

The relay station may assign an ID to each sector, and report about which sector among sectors of the station scan request frame is being currently broadcasted.

In response to the station scan request frame, the relay station may receive a station scan response frame from the stations included in the BSS, using a response duration corresponding to a station scan request frame having a strongest signal strength.

Figure 9:
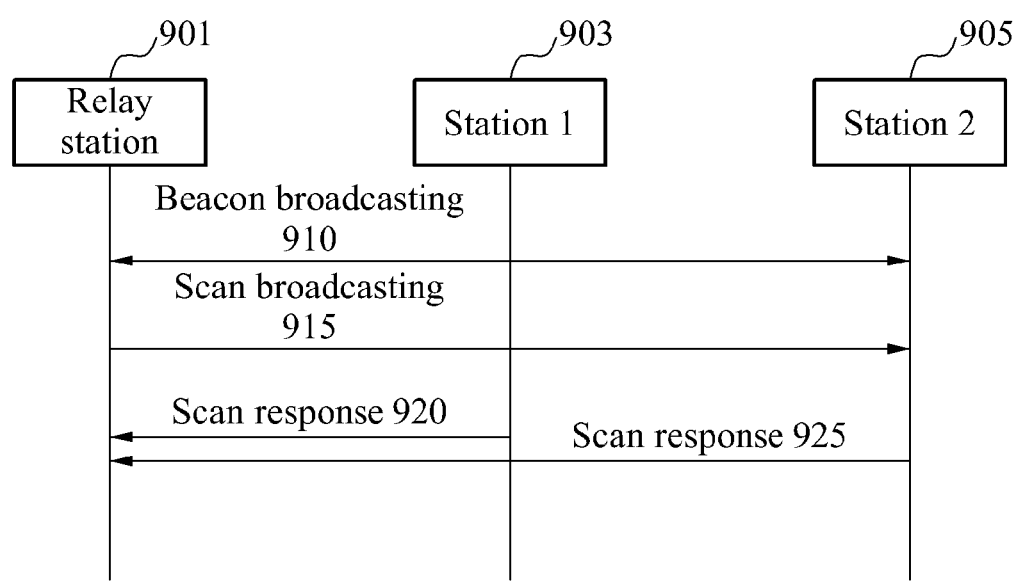
FIG. 9 is a flowchart illustrating a scan process of a relay station in a WLAN Independent Basic Service Set (IBSS) mode according to an embodiment of the present invention.

FIG. 9 is a flowchart illustrating a scan process of a relay station in a WLAN IBSS mode according to an embodiment of the present invention.

Referring to FIG. 9, in the WLAN IBSS mode, a wireless network may include a relay station 901, a station (1) 903, and a station (2) 905. The station (1) 903 and the station (2) 905 may correspond to at least one station included in an IBSS.

When a coordinator is absent in the IBSS mode, all the stations within the network may transmit a beacon in operation 910. Accordingly, the relay station 901 may also transmit a beacon to at least one station included in the IBSS within the wireless network in operation 910.

In operation 915, the relay station 901 obtaining a channel within the wireless network may broadcast, to the at least one station (here, the station (1) 903 and the station (2) 905) a scan request frame or a beacon including scan request information.

In operations 920 and 925, the relay station 901 may receive, from the at least one station, a scan response frame responding to the broadcasting.

The relay station may verify a position of at least one station included in the IBSS by a handover from a coordinator of the wireless network.

Here, a duration for transmitting the scan response frame may be determined according to a directional Media Access Control (MAC) access scheme used in the IBSS. For example, an IEEE 802.15.3c WPAN may support a handover of a PNC which is different from IEEE 802.11. Due to various reasons, a handover may occur. When a connection state between the coordinator, for example, the PNC and stations is poor, when the PNC is powered off, and when a station with a relatively high priority enters, the handover may occur. A relay station that becomes a new coordinator due to the handover may perform a handover to the coordinator when a position of each station included in a network is verified through a beacon.

Example embodiments include computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A communication method of a coordinator, the method comprising:
    receiving a relay search request frame for requesting a search for at least one relay station between a destination station and a source station; and
    transmitting, in response to the relay search request frame, a relay search response frame including a list of the at least one relay station,
    wherein the relay search request frame comprises a category field for setting a range of a millimeter wave used in a wireless network, an action field for setting a value associated with a search request with respect to the at least one relay station, a dialog token field set to a value selected by a station transmitting the relay search request frame, and a destination station AID field for setting an AID for the destination station, and
    where the relay search response frame comprises a category field for setting a range of a millimeter wave used in a wireless network, an action field for setting a value associated with a relay search response corresponding to a search request with respect to the at least one relay station, a dialog token field for setting a value about the relay search request frame used to generate the relay search response, and a relay capable station info field denoting information associated with a corresponding station.

2. The method of claim 1, further comprising:
assigning a resource for performing beamforming in a link between the source station and the at least one relay station and a link between the destination station and the at least one relay station;
receiving, from the source station, a resource request for performing beamforming in a link between the source station and the destination station after the source station obtains information associated with a result of the beamforming, and responding to the resource request; and
broadcasting, to the source station and the destination station, information associated with a resource assigned to the link between the source station and the destination station.

3. The method of claim 1, wherein the dialog token field of the relay search request frame is set to identify a transaction between a search request for the at least one relay station and a corresponding response.

4. The method of claim 1, wherein the relay capable station info field is included in the relay search response frame when a status code field, included in the relay search response frame, indicates success.

5. A communication method of a source station, the method comprising:
transmitting, to a coordinator, a relay search request frame for requesting a search for at least one relay station between a destination station and the source station; and
receiving, from the coordinator in response to the relay search request frame, a replay search response frame comprising a list of the at least one relay station,
wherein the relay search request frame comprises a category field for setting a range of a millimeter wave used in a wireless network, an action field for setting a value associated with a search request with respect to the at least one relay station, a dialog token field set to a value selected by a station transmitting the relay search request frame and a destination station AID field for setting an AID for the destination station, and
wherein the relay search response frame comprises a category field for setting a range of a millimeter wave used in a wireless network, an action field for setting a value associated with a relay search response corresponding to a search request with respect to the at least one relay station, a dialog token field for setting a value about the relay search request frame used to generate the relay search response and a relay capable station info field denoting information associated with a corresponding station.

6. The method of claim 5, further comprising:
performing beamforming in a link between the at least one relay station and the source station using a resource assigned by the coordinator;
transmitting a multi-relays channel measurement request frame to the at least one relay station; and
receiving, in response to the multi-relays channel measurement request frame, a multi-relays channel measurement report frame from the at least one relay station,
wherein the multi-relays channel measurement report frame comprises information associated with a result of beamforming performed in each of a link between each of the at least one relay station and the source station and a link between each of the at least one relay station and the destination station.

7. The method of claim 6, further comprising:
requesting the coordinator for a resource for performing beamforming in a link between the source station and the destination station after obtaining information associated with the result of beamforming;
performing beamforming with respect to the link between the destination station and the source station using the resource assigned from the coordinator; and
receiving, from the destination station, the multi-relays channel measurement report frame comprising channel information associated with each of links of relay stations performing beamforming with the destination station among relay stations included in the list of the at least one relay station.

8. The method of claim 7, further comprising:
selecting, as a target relay station, an optimal relay station from the at least one relay station using a position of the at least one relay station and channel information associated with each of the links.

9. The method of claim 6, wherein the performing beamforming in the link between the at least one relay station and the source station comprises performing beamforming, based on a sector unit, in the link between the at least one relay station and the source station.

10. The method of claim 5, wherein the multi-relays channel measurement request frame comprises at least one of a category field for setting a range of a millimeter wave used in a wireless network, an action field for setting a value associated with a multi-relays channel measurement request, and a dialog token field for setting a value selected by a station transmitting the multi-relays channel measurement request frame, in order to identify a transaction between a measurement request with respect to a multi-relays channel and a corresponding response.

11. The method of claim 5, wherein the multi-relays channel measurement report frame comprises at least one of a category field for setting a range of a millimeter wave used in a wireless network, a dialog token field set to a value included in the multi-relays channel measurement request frame, and at least one channel measurement info field comprising information associated with a link with each of the at least one relay station and the source station.

12. The method of claim 11, wherein the at least one channel info field comprises at least one of a destination AID field comprising an AID of each of at least one relay station of which a link is measured by the destination station, and a recommend field indicating whether a signal to noise ratio (SNR) value measured in each link between the destination station and the at least one station, an angle between the link between each of the at least one relay station and the source station, and the at least one relay station are suitable for relaying between the source station and the destination station determined by the at least one relay station.

13. A communication method of a destination station, the method comprising:
receiving, from a coordinator, a relay search response frame comprising a list of at least one relay station between the destination station and a source station;
being assigned, from the coordinator, a resource for performing beamforming in a link between the destination station and the at least one relay station;
performing beamforming with the at least one relay station using the assigned resource;
performing beamforming in a link between the source station and the destination station using the assigned resource in response to a request of the source station desiring to select a target relay station from the at least one relay station; and transmitting, to the source station, information obtained from a result of the beamforming, wherein the relay search response frame comprises a category field for setting a range of a millimeter wave used in a wireless network, an action field for setting a value associated with a relay search response corresponding to a search request with respect to the at least one relay station a dialog token field for setting a value about the relay search request frame used to generate the relay search response, and a relay capable station info field denoting information associated with a corresponding station.

14. A communication method of a relay station included in a wireless network, the method comprising:

receiving information associated with a resource assigned from a coordinator in order to perform beamforming in a link with each of a source station and a destination station, the source station requesting a search for at least one relay station between the destination station and the source station;

performing beamforming with respect to the link with each of the destination station and the source station using the assigned resource; and transmitting a multi-relays channel measurement report frame comprising information associated with a result of beamforming so that the source station selects an optimal relay station from the at least one relay station, wherein the multi-relays channel measurement report frame comprises a category field for setting a range of a millimeter wave used in a wireless network, a dialog token field set to a value included in the muiti-relays channel measurement request frame, and at least one channel measurement info field comprising information associated with a link with each of the at least one relay station and the source station.

* * * * *